Dec. 9, 1969  C. A. WILEY  3,483,558
RADAR RECEIVER EMPLOYING A SYNTHETIC COHERENT REFERENCE
Filed Aug. 13, 1964  4 Sheets-Sheet 1

INVENTOR.
CARL A. WILEY
BY
ATTORNEY

INVENTOR.
CARL A. WILEY

10 Claims

United States Patent Office 3,483,558
Patented Dec. 9, 1969

3,483,558
RADAR RECEIVER EMPLOYING A SYNTHETIC COHERENT REFERENCE
Carl A. Wiley, Corona Del Mar, Calif., assignor to North American Rockwell Corporation, a corporation of Delaware
Filed Aug. 13, 1964, Ser. No. 389,299
Int. Cl. G01s 9/42
U.S. Cl. 343—7.7      11 Claims The subject invention relates to an airborne pulsed-energy radar system in which the receiver employs an arbitrary reference signal for processing received echo signals; and more particularly to means responsive to one of a transmitted pulse and an early ground-return echo for providing a phase coherent reference.

In the design of radar systems employing coherent receiver techniques, the received echo signals are compared with a reference signal which preserves the phase of the transmitted signal. By means of such technique, an echo return signal may be better distinguished from radar noise background. Also, the Doppler shift of a moving target moving radially relative to the radar system may be distinguished from the echo return provided by relatively stationary targets. In such moving target indicator (MTI) radar application as described, for example, at pages 113–114 of "Introduction to Radar System" by Skolnik (McGraw-Hill, 1962), the continuous-wave (CW) oscillator of a pulse-modulated radar transmitter has been conventionally employed as a phase-coherent receiver. Such receiver is generally comprised of a phase-detector responsive to the received signal and the reference signal as shown, for example, in FIG. 4.44 on page 156 of the above cited "Introduction to Radar Systems." The phase-reference thus provided by the CW oscillator for a delayed echo signal received from a given range, corresponds to the then-existing state of the CW oscillator and not the state thereof at the time of the transmission of the pulse-modulated CW wave which resulted in the subsequently received echo signal. Therefore, any interim jitter or variation in the performance of the CW oscillator will result in providing a subsequently improper phase reference for the received signal. In other words, the subsequent state of the CW oscillator output at the delayed time of the received echo signal is not necessarily truly coherent with the transmitted pulse, and therefore may not provide an adequate reference for measuring the coherence of the received echo to the transmitted pulse.

By means of one aspect of the concept of the subject invention, such performance limitation is overcome by sampling and storing the transmitted pulse to provide a subsequent coherent reference for echo signals received during the subsequent pulse repetition period.

In an attempted airborne application, coherent-type MTI radars are subject to Doppler-shift effects in both the ground clutter return and moving target echoes, due to the motion of the radar, itself. Therefore, prior art use of such coherent radars has required the inclusion of an adjustable, compensatory Doppler frequency oscillator (and mixer) responsive to the platform motion of the radar system to compensate for the additional Doppler shift caused thereby, as shown for example in the above cited FIG. 4.44 of "Introduction to Radar System."

By means of another aspect of the concept of the subject invention the requirement of such ancillary compensatory equipment is obviated by sampling and storing an early ground return echo to provide a subsequent clutter reference for echo signals received during the remainder of the pulse repetition period.

In a preferred embodiment of the invention, there is provided a pulsed radar system having a transmitter and receiver. There is also provided means cooperating with the transmitter and receiver for providing a phase reference signal and comprising a wedge delay line having discrete reflecting surfaces and responsively coupled for sampling and stretching one of a transmitted signal and an early ground return echo to provide a stored signal during one pulse repetition period. A saturating amplifier responsive to the delay line removes variations in the amplitude envelope of the stored signal to provide a phase-reference employed by the receiver during such pulse repetition period.

In normal operation of the above described arrangement, the receiver combines the reference signal and received echo signal to provide a detected signal. Where the transmited pulse is employed in generating the reference, a coherent radar receiver function is achieved. Where the early ground return echo is employed as a reference, the device may be adapted to provide non-coherent MTI processing. Further, in terrain regions where no natural clutter occurs such as over bodies of water, the stored clutter return from the delay line continues to provide a clutter reference which would otherwise be missing. Accordingly, it is an object of the subject invention to provide adaptable synthetic reference signal means for a radar receiver.

It is another object of the invention to provide a synthetic reference for a coherent radar system.

It is yet another object of the invention to provide a clutter reference for a radar system adapted to MTI processing.

It is still another object of the invention to provide reference signal means in a radar receiver and comprising a saturating amplifier in cooperation with a wedge delay line having discrete reflecting surfaces.

These and other objects of the subject invention will become apparent from the following description, taken together with the following drawings in which.

In the figures, like reference characters refer to like parts.

Figure 1:
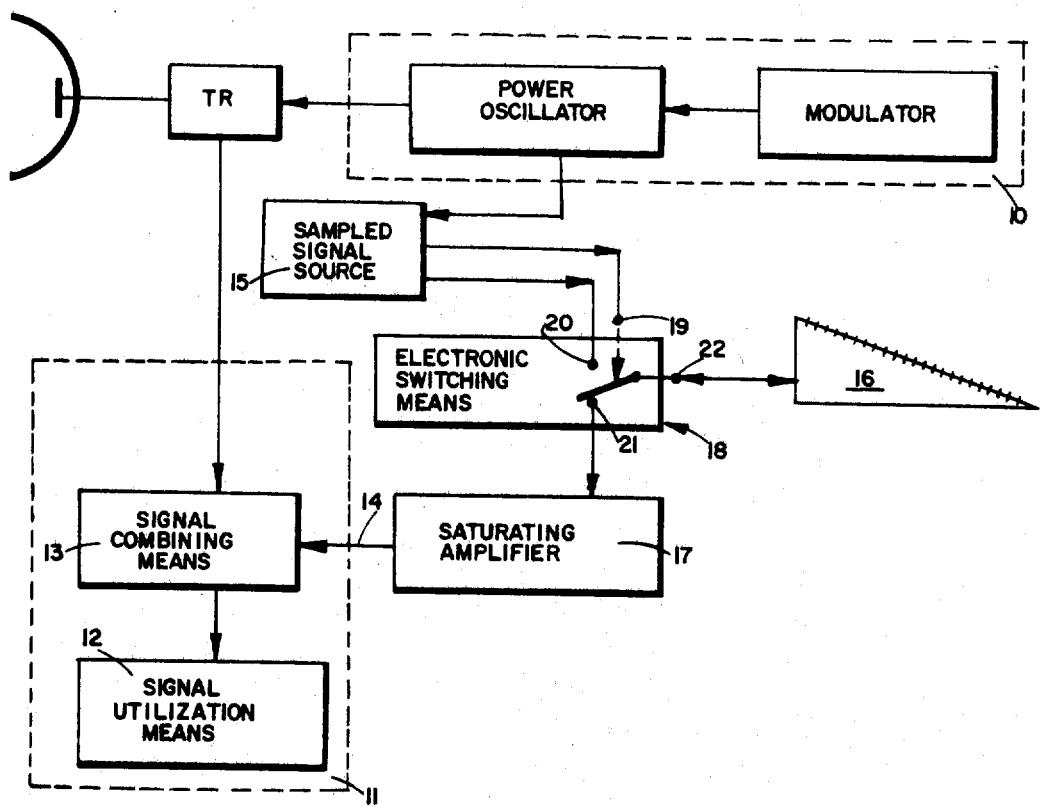
FIG. 1 is a block diagram of a system employing the concept of the invention.

Referring now to FIG. 1, there is illustrated a block diagram of a system employing the concept of the invention. There is provided a pulsed radar system comprising a transmitter 10 (having a pulse-modulated power oscillator), and a radar receiver 11 comprising signal utilization means 12 coupled to receiver signal combining means 13 having a reference signal input terminal or line 14. A sampled signal source 15 cooperates with transmitter 10 to provide pulsed energy samples for reasons which will subsequently become more apparent. The construction and arrangement of source 15 will be explained more fully in connection with the descriptions of FIGS. 2 and 3. There is also provided a wedge delay line 16 having a stepped or roughened interior surface whereby discrete reflecting surfaces spaced therealong are provided.

There is further provided a saturating amplifier 17 constructed and arranged by means well understood in the art for providing an output signal having an invariant amplitude envelope in response to an input signal. The output of amplifier 17 is operatively coupled to signal combining means 13. Also included in the embodiment of FIG. 1 is voltage-controlled switching means 18 having a control terminal 19 and a first switch terminal 20 commonly coupled to sampled signal source 15 so as to be responsive to the pulsed energy samples therefrom. A second switch terminal 21 is coupled to the input of saturating amplifier 17; and a third switchable terminal 22 is coupled to delay line 16 for normally interconnecting the output of delay line 16 to second terminal 21. Hence, switch 18 is responsive to pulsed energy samples (from source 15) for interconnecting third switchable terminal 22 and second terminal 21 during the duration of each pulse-sample, being constructed and arranged in the manner of a T-R (transmit-receive) box, as is more fully described in connection with the description of FIG. 4.

In normal operation of the arrangement of FIG. 1, terminals 20 and 22 of switch 18 couples sampled energy from source 15 to delay line 16 for the duration of such sampled energy, in response to the application of such energy sample to the control terminal 19 of switch 18. After such interval, terminals 22 and 21 are reconnected and switch 18 restored to its normal state. The energy pulse applied to delay line 16 is propagated down the length of such wedge delay line and is subsequently reflected back again from the number of discrete reflecting surfaces spaced along this interior surface of delay line 16. Accordingly, the interval over which the pulsed energy echoes continue to be received back is substantially greater than the duration of the energy sample, and preferably equal to a range-time interval corresponding to the desired maximum range performance of the radar system. Therefore, wedge delay line 16 performs stretching of the duration of an energy sample or energy pulse applied thereto, to provide a stored signal.

Figure 4:
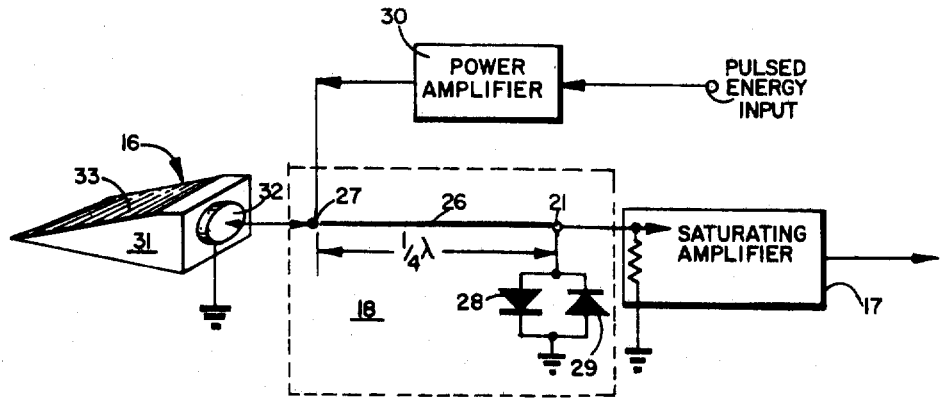
FIG. 4 is a schematic arrangement of a preferred embodiment of the electronic switch and delay line of FIGS. 1, 2 and 3.

The delay line echoes or stored signals are coupled to the input of saturating amplifier 17 by means of the normally mutually interconnected states of switch terminals 21 and 22. The saturating amplifier attempts to amplify the signals of stretched duration to the amplitude saturation limits of amplifier 17, whereby output signals having an invariant amplitude envelope result. Such signals are then fed to combining means 13 for use as phase reference signals. The phase reference signals are combined with the delayed echo signals received at all radar ranges for which an echo signal results, to provide a detected signal to be utilized by signal utilization means 12.

Where the sampled signal source employs the pulse modulated output of transmitter 10, then signal combining means 13 may be a phase-sensitive detector for providing a bipolar video output, and signal utilization means 12 may be an MTI delay-line canceller, as shown in FIGS. 4.6 and 4.7 respectively of the above cited "Introduction to Radar Systems." Where, however, the sampled signal source employs a gated early return of received ground clutter, then signal combining means 13 may be a mixer for providing a clutter referenced signal, and signal utilization means 12 may be noncoherent AMTI processing means, as described for example at pages 154–157 of the above cited "Introduction to Radar Systems."

Figure 2:
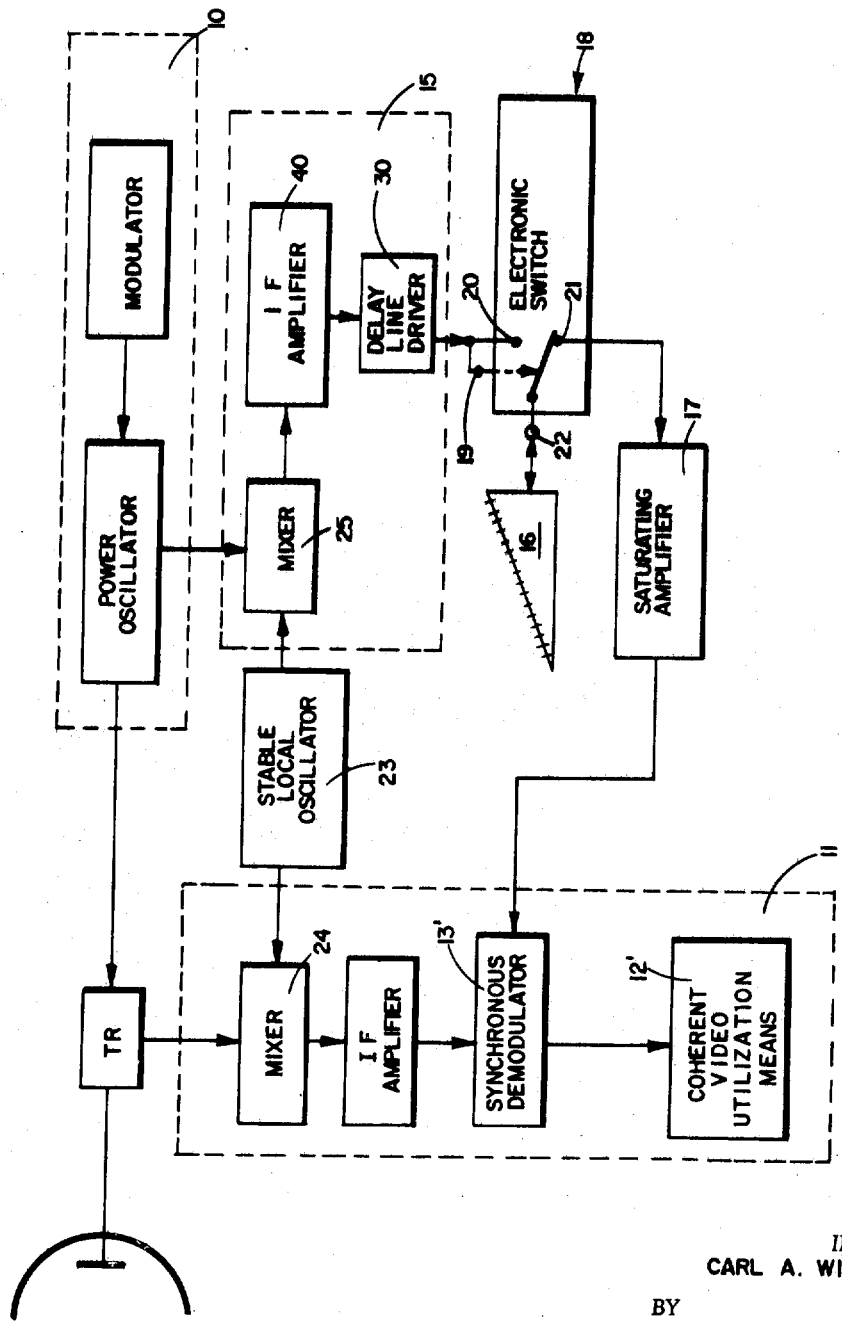
FIG. 2 is a block diagram of one embodiment of the invention.

An embodiment of the inventive concept as applied to coherent radar systems is shown in FIG. 2.

Referring to FIG. 2 there is illustrated a block diagram of one embodiment of the concept of FIG. 1 as applied to coherent radar systems. There is provided transmitter 10, receiver 11, delay line 16, saturating amplifier 17 and switch 18 constructed and arranged as like referenced elements of FIG. 1. There is also provided a stable local oscillator 23, and a receiver-mixer 24 responsive to oscillator 23 for reducing the frequency of received echo signals to an intermediate frequency, as is well-understood in the art. A second mixer 25 is responsively coupled to oscillator 23 and the pulse-modulated power oscillator of transmitter 10, for providing pulsed energy samples at the receiver intermediate frequency. The sampled IF energy from second mixer 25 is fed to switch 18 by means of the tandem arrangement of an IF amplifier 40 and a driver amplifier 30.

The cooperation of switch 18 with delay line 16 and saturating amplifier 17 provides a time-interval stretched, amplitude envelope-invariant IF phase reference signal at the output of amplifier 17, as was explained in connection with the description of FIG. 1. The output of saturating amplifier 17 is combined with the IF receiver signal by means of a synchronous demodulator 13' to provide a video signal which is indicative of the coherence of the receiver IF signal with the IF reference signal from amplifier 17 as is well understood in the art. Hence, it is to be appreciated that the arrangement of FIG. 2 comprises a coherent radar system, wherein the combination of second mixer 25, IF amplifier 40 and driver 30 correspond to sampled energy source 15 of FIG. 1.

Figure 3:
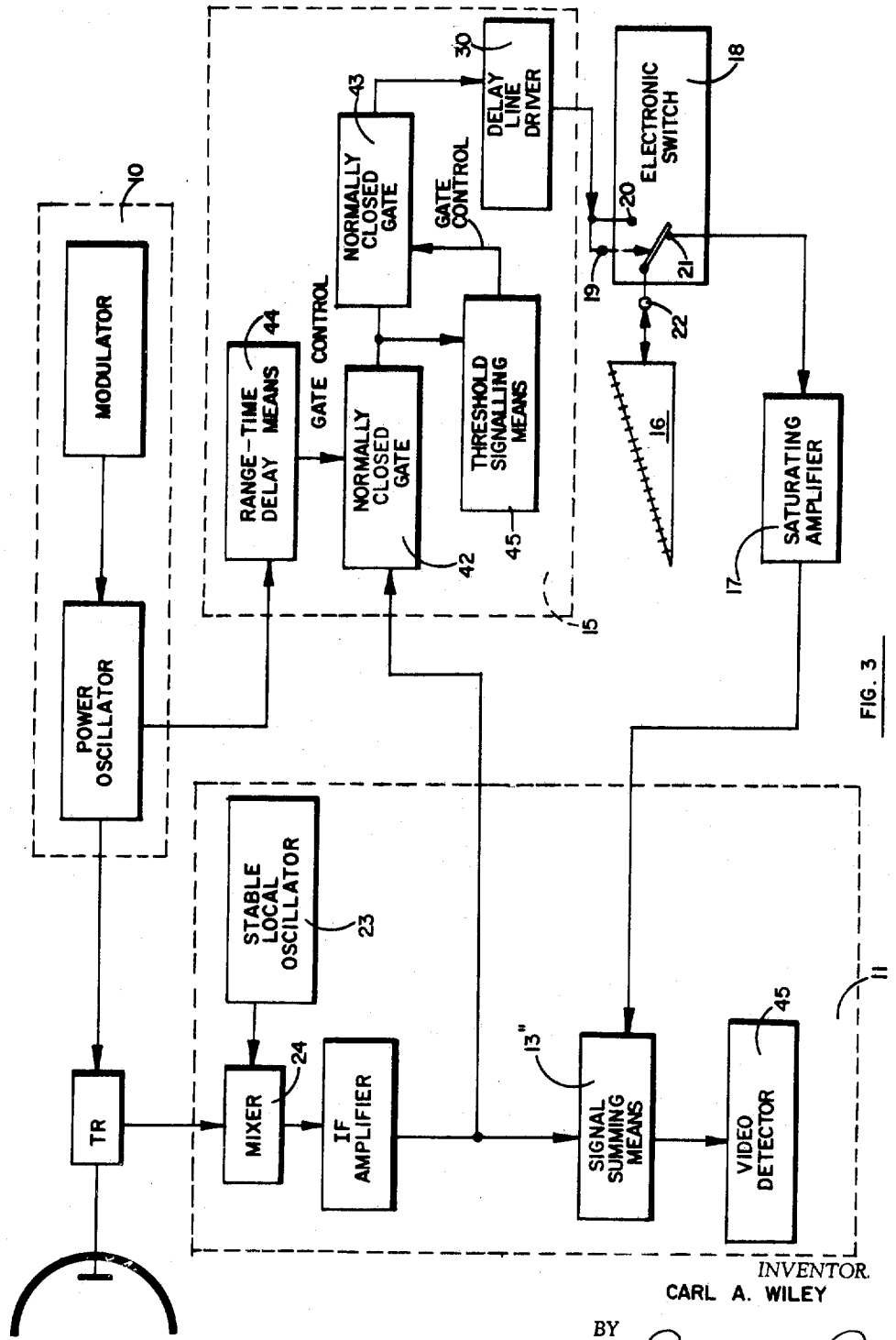
FIG. 3 is a block diagram of an alternate embodiment of the invention.

An alternate embodiment of the concept of FIG. 1 adapted for AMTI data processing shown in FIG. 3.

Referring to FIG. 3, there is illustrated a block diagram of an alternate embodiment of the concept of FIG. 1, and having a synthetic clutter reference. There is provided transmitter 10, receiver 11, delay element 16, amplifier 17, and switch 18 constructed and arranged as like referenced elements of FIG. 1, delay line 16 being responsively coupled for sampling and stretching an early ground-return echo signal, provided by sampled signal source 15.

Sampled signal source 15 comprises a normally-closed gate 42 and normally-closed gate 43, connected in tandem and interconnecting the IF stage output of receiver 11 with the input to delay line driver 30. Such normally closed gates correspond to normally switched-off states of the associated signals switched or gated by such gates. A delay line element 44 for providing a preselected time delay responsively couples a gate control input of normally-closed gate 42 to the pulsed output of transmitter 10. Signalling means 45 having a preselected threshold responsively couples the gate control input of normally-closed gate 43 to the output of gate 42, when the output of gate 42 exceeds a selected threshold value.

In normal operation of the arrangement of FIG. 3, a portion of the transmitter pulse from transmitter 10 is delayed by element 44 to provide a delayed control pulse for opening gate 42 for the duration of the delayed pulse, thereby sampling a portion of the early ground return received by receiver 11 at a selected interval after the transmitted pulse. Such sampled ground clutter return is fed to the pulse-stretching arrangement of wedge delay line 16, saturating amplifier 17 and switch 18 to provide a clutter-reference signal of constant amplitude. Such reference signal is then combined with the receiver IF signal by means of signal combining means 13 and then detected by video detector 45 to provide a clutter-referenced video signal (e.g., a composite signal having a D-C or low frequency clutter spectra and beat-frequency components indicative of a moving target). Such clutter-referenced video signal may then be filtered or further processed to provide a signal indicative of a moving target sensed by an airborne radar system (i.e., AMTI processing).

A preferred arrangement of switch 18 and wedge delay line 16 of FIGS. 1, 2 and 3 is shown in FIG. 4.

Referring to FIG. 4, there is illustrated a preferred embodiment of the arrangement of switch 18 and delay line 16 of FIG. 1. There is provided a quarter-wave length coaxial line 26, or the like, having an input end 27 and an output end 21. A pair of oppositely-poled diodes 28 and 29 having a preselected threshold are shunt connected across the output 21 of coax 26, the output of switch 18 being operatively coupled to the input of saturating amplifier 17.

Wedge delay line 16 is comprised of a wedge-shaped block 31 of fused quartz having a transducer 32 of natural quartz bonded to a base thereof opposite the vertex angle of the wedge shape. Such bond may be provided by evaporated indium or other suitable cements known in the art. The back or inclined wedge face 33 of the synthetic quartz block 31 is stepped or roughened (by sandblasting, for example) that such area manifests a plurality of discrete reflecting surfaces spaced therealong. Tranducer 32 is connected in electrical circuit to the input 27 of coax 26.

There is further provided a power amplifier 30 having an input adapted to be connected to a source of pulsed A-C energy of a selected carrier frequency, such as pulsed energy source 15 of FIG. 1, and having an output connected to terminal 27 of coax 26.

Figure 5:
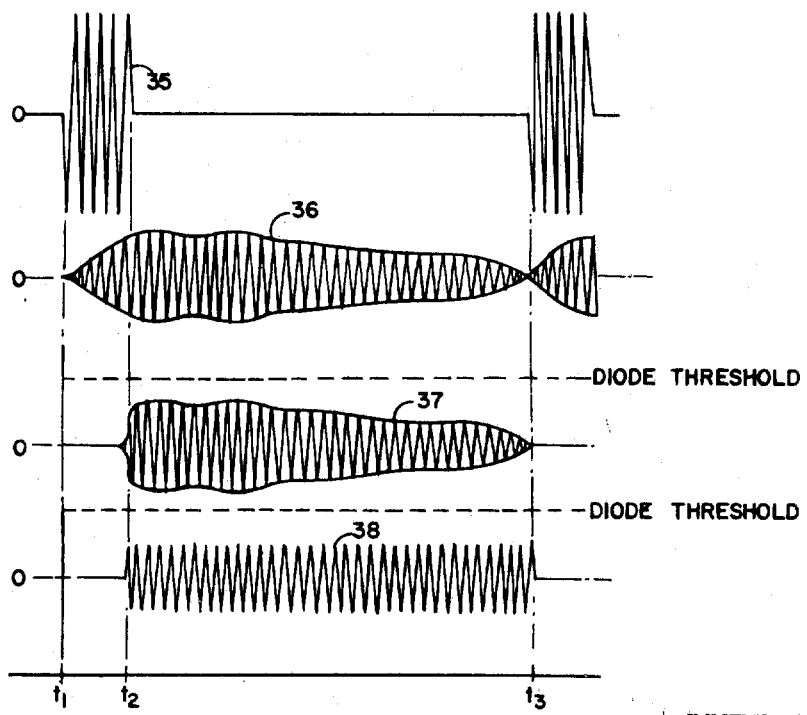
FIG. 5 is a family of time histories of the response of the device of FIG. 4.

The operation of switch 18 of FIG. 4 maybe more fully appreciated from a consideration of FIG. 5.

In the normal operation of the arrangement of FIG. 4, the high-level pulsed power output of amplifier 30 (curve 35 from $t_1$ to $t_2$ in FIG. 5) is applied to both transducer 32 of delay element 16 and the input 27 of coax 26. Although the quarter-wave length of coax 26 serves to attenuate the amplitude envelope of the output of amplifier 30 appearing at terminal 21 of coax 27, such reduced amplitude is yet not below the threshold of shunt diodes 28 and 29. Accordingly, diodes 28 and 29 become conductive and consequently short the high-powered pulse output appearing at terminal 21 (curve 37 from $t_1$ to $t_2$ in FIG. 5), thereby preventing the insertion of such power into the input of saturating amplifier 17. At the end of the pulse-interval ($t_2$ in FIG. 5), diodes 28 and 29 become non-conductive.

The applied input energy to wedge delay line 16 is transmitted along the length thereof and reflected back, with various delays to transducer 32 from the discrete reflecting surfaces severally spaced along side 33, to produce a time-duration stretched, attenuated output therefrom (curve 36 in FIG. 5). Such attenuated output is fed to coax 26 and further attenuated at the output terminal 21 by the quarter-wavelength effect of coax 26, as to be substantially below the threshold of shunting diodes 28 and 29. Hence, during the non-occurrence of the pulsed energy output from power amplifier 30, the output of delay line 16 is fed as an input to saturating amplifier 17 (curve 37 during $t_2$ to $t_3$ of FIG. 5), where such A-C input is amplified to the saturation level of amplifier 17 to provide a constant amplitude output signal (curve 38 from $t_2$ to $t_3$ in FIG. 5).

Accordingly, inproved means have been described for providing a synthetic coherent reference of a radar system.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a radar system, means for providing a phase reference comprising
    a delay line having discrete reflecting surfaces and responsively coupled for sampling and stretching a preselected one of a transmitted signal and an early ground return echo signal to provide a stored signal, and
    a saturating amplifier responsive to said stored signal.

2. In a radar system adapted for airborne use, a coherent receiver comprising
    a delay line having discrete reflecting surfaces and responsively coupled for sampling and stretching a preselected one of a transmitted signal and an early ground return echo signal to provide a stored signal;
    a saturating amplifier responsive to said stored signal for providing a phase reference signal; and
    a phase-sensitive detector responsive to both received echo signals and said phase-reference signal for providing a phase-sensitive detected signal.

3. Means for stretching an A-C energy pulse having a selected carrier frequency, comprising
    a quarter wave length conductor of such energy, having input and output terminals;
    a pair of oppositely-poled diodes shunted connected across said output terminal of said quarter wave length conductor, and having a preselected threshold characteristic;
    a wedge delay line having mutually spaced discrete reflecting surfaces there along and operatively connected to said input terminal of said quarter wave length conductor; and
    a delay line driving amplifier adapted to be coupled to a source of said A-C energy pulse and having an output thereof coupled to the input of said delay line.

4. Means responsive to an A-C energy pulse having a selected carrier frequency for providing a phase reference, comprising
    a quarter wave length conductor of such energy, having input and output terminals;
    a pair of oppositely-poled diodes shunt connected across said output terminal of said quarter wave length conductor, and having a preselected threshold characteristic;
    a wedge delay line having mutually spaced discrete reflecting surfaces therealong and operatively connected to said input terminal of said quarter wave length conductor;
    a delay line driving amplifier adapted to be coupled to a source of said A-C energy pulse and having an output thereof coupled to the input of said delay line; and
    a saturating amplifier responsively coupled to the output terminal of said conductor.

5. In a radar system, means for providing a coherent receiver having a synthetic phase reference, comprising
    a sampled signal source cooperating with the transmitter of said radar system for providing pulsed energy samples;
    a wedge delay line having discrete reflecting surfaces spaced at successive intervals from a common input-delayed output end of said delay line and a transducer coupled to said sampled signal source;
    a saturating amplifier;
    voltage controlled switching means for normally interconnecting the output of said delay line to the input of said amplifier, said switching means being responsive to said pulsed energy samples for disconnecting during the duration thereof said delay line and amplifier; and
    receiver signal combining means having a first and second input responsive to a respective one of a received signal and the output of said saturating amplifier for providing a signal to be utilized.

6. In a radar system, means for providing a coherent receiver having a synthetic phase reference, comprising
    a sampled signal source cooperating with the transmitter of said radar system for providing pulsed energy samples;
    a wedge delay line having discrete reflecting surfaces spaced at successive intervals from a common input-delayed output end of said delay line;
    a saturating amplifier;
    voltage controlled switching means having a control terminal and a first switch terminal commonly responsive to said pulsed energy samples, a second switch terminal coupled to the input of said saturating amplifier, and a third switchable terminal coupled to said wedge delay line for normally interconnecting the output of said delay line to said second terminal, said switch being responsive to said pulsed energy samples for interconnecting during the duration thereof said third switchable and second terminals; and
    receiver signal combining means having a first and second input responsive to a respective one of a received signal and the output of said saturating amplifier for providing a signal to be utilized.

7. In a radar system, means for providing a coherent receiver having a synthetic phase reference, comprising
a stable local oscillator;
a receiver-mixer responsive to said oscillator for reducing the frequency of received echo signals to an intermediate frequency;
a sampled signal source cooperating with said transmitter of said radar system for providing pulsed energy samples;
a delay line having discrete reflecting surfaces spaced at successive intervals from a common input-delayed output end of said delay line;
a saturating amplifier;
voltage controlled switching means normally interconnecting the output of said delay line to said amplifier, said switching means being responsive to said pulsed energy samples for disconnecting during the duration thereof said delay line and amplifier; and
receiver signal combining means having a first and second input responsive to a respective one of a received signal and the output of said saturating amplifier for providing a signal to be utilized.

8. In a pulsed radar system, a coherent receiver comprising
a delay line having discrete reflecting surfaces and responsively coupled for sampling and stretching a transmitted signal to provide a stored signal;
a saturating amplifier responsive to said stored signal for providing a phase-reference signal; and
synchronous demodulating means responsive to both received echo signals and said reference signal for providing a detected signal coherent with said reference signal.

9. In a pulsed radar system adapted for airborne use, a non-coherent receiver having a synthetic clutter reference comprising
a delay line having discrete reflecting surfaces and responsively coupled for sampling and stretching an early ground-return echo signal to provide a stored signal;
a saturating amplifier responsive to said stored signal for providing a phase-reference signal; and
signal-combining and detecting means responsive to received echo signals and said reference signal for providing a video signal containing spectral components representing the beat frequency difference between said received signal and said reference signal.

10. In a radar system, means for providing a coherent receiver having a synthetic phase reference, comprising
a stable local oscillator;
a receiver-mixer responsive to said oscillator for reducing the frequency of received echo signals to an intermediate frequency;
a second mixer responsive to said oscillator and the transmitter of said radar system for providing pulsed energy samples at said intermediate frequency;
a delay line having discrete reflecting surfaces spaced at successive intervals from a common input-delayed output end of said delay line;
a saturating amplifier;
switching means normally interconnecting the output of said delay line to said amplifier, said switch being responsive to said pulsed energy samples for disconnecting during the duration thereof said delay line and amplifier; and
synchronous demodulating means having a first and second input coupled to a respective one of said saturating amplifier and receiver mixer for providing a coherent video received signal.

11. In a pulsed radar system adapted for airborne use, a non-coherent receiver having a synthetic clutter reference comprising
a stable local oscillator;
a receiver-mixer responsive to said oscillator for reducing the frequency of received echo signals to an intermediate frequency;
delayed gating means responsive to said pulsed radar system and coupled to said receiver-mixer for providing pulsed energy samples of early-return echo signals received during a selected range-time interval;
a delay line having discrete reflecting surfaces spaced at successive intervals from a common input-delayed output end of said delay line and responsively coupled to said gating means;
a saturating amplifier for providing a reference signal;
switching means for normally inter-connecting the output of said delay line to said amplifier, said switch being responsive to said pulsed energy samples for dis-connecting during the duration thereof said delay line and said amplifier; and
signal combining and detecting means responsive to said receiver-mixer and said saturating amplifier for providing a video signal containing spectral components representing the beat frequency between said received signals and said reference signal.

References Cited

UNITED STATES PATENTS

| 2,408,742 | 10/1946 | Eaton | 343—9 |
| 2,659,077 | 11/1953 | Emslie | 343—7.7 |
| 2,659,078 | 11/1953 | Sherr | 343—7.7 |

RODNEY D. BENNETT, Jr., Primary Examiner

H. C. WAMSLEY, Assistant Examiner